(12) United States Patent
Moss et al.

(10) Patent No.: US 8,958,014 B2
(45) Date of Patent: *Feb. 17, 2015

(54) CAPTURING MEDIA IN SYNCHRONIZED FASHION

(71) Applicant: Apple Inc., Cupertino, CA (US)

(72) Inventors: Nicolas Moss, Aptos, CA (US); Gregory R. Chapman, San Jose, CA (US); John Samuel Bushell, San Jose, CA (US); Bradley Ford, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,255

(22) Filed: Nov. 4, 2013

(65) Prior Publication Data

US 2014/0056569 A1 Feb. 27, 2014

Related U.S. Application Data

(63) Continuation of application No. 11/873,319, filed on Oct. 16, 2007, now Pat. No. 8,576,922.

(60) Provisional application No. 60/943,060, filed on Jun. 10, 2007.

(51) Int. Cl.
*H04N 9/475* (2006.01)
*G11B 27/10* (2006.01)
*H04N 21/2368* (2011.01)
*H04N 21/43* (2011.01)
*H04N 21/434* (2011.01)
*H04N 21/462* (2011.01)
(Continued)

(52) U.S. Cl.
CPC ............ *G11B 27/10* (2013.01); *H04N 21/2368* (2013.01); *H04N 21/4305* (2013.01); *H04N 21/4307* (2013.01); *H04N 21/4341* (2013.01); *H04N 21/4622* (2013.01); *H04N 5/04* (2013.01); *H04N 9/802* (2013.01)
USPC ................... 348/515; 375/240.28; 348/423.1; 348/425.4; 348/500; 348/512; 348/513

(58) Field of Classification Search
CPC .......... H04N 21/2368; H04N 21/4341; H04N 21/4307; H04N 21/4305; H04N 21/242; H04N 5/04; H04N 21/8547; H04N 21/2365; H04N 21/4302; H04N 21/4347; H04N 21/23424; H04N 21/23614; H04N 21/4223; H04N 21/4348
USPC ................... 375/240.28, 293; 348/194, 423.1, 348/425.4, 500, 512, 513, 515, 516; 370/100.1, 304, 324, 350, 503
See application file for complete search history.

(56) References Cited

U.S. PATENT DOCUMENTS 5,594,660 A 1/1997 Sung et al.
5,914,757 A 6/1999 Dean et al.
(Continued)

*Primary Examiner* — Sath V Perungavoor
*Assistant Examiner* — Nathnael Aynalem
(74) *Attorney, Agent, or Firm* — Kenyon & Kenyon LLP

(57) ABSTRACT

Techniques for synchronizing audio and video content for presentation to a user at a same rate are provided. Streams of content from two or more sources of media, each media source having an associated clock, are synchronized by a synchronizing component and processor with respect to a master clock. As well, techniques are provided for ensuring that output devices are synchronized at preview startup. That is, such techniques ensure that the output devices start playing the media at the same time as well as at the same rate.

21 Claims, 6 Drawing Sheets

(51) Int. Cl.
*H04N 5/04* (2006.01)
*H04N 9/802* (2006.01)

(56) References Cited

U.S. PATENT DOCUMENTS

| | | |
|---|---|---|
| 6,452,974 B1 | 9/2002 | Menon et al. |
| 6,754,234 B1 | 6/2004 | Wiesner |
| 6,806,750 B1 | 10/2004 | Rasmussen et al. |
| 6,906,755 B2 | 6/2005 | Lundblad et al. |
| 7,280,156 B2 | 10/2007 | Roelens |
| 7,631,119 B2 * | 12/2009 | Moore et al. ............ 710/52 |
| 7,653,925 B2 * | 1/2010 | Hull et al. ............ 725/37 |
| 2002/0093590 A1 | 7/2002 | Hodgkiss et al. |
| 2004/0143675 A1 * | 7/2004 | Aust ............ 709/236 |
| 2005/0083437 A1 * | 4/2005 | Uchida et al. ............ 348/515 |

* cited by examiner

CAPTURING MEDIA IN SYNCHRONIZED FASHION

PRIORITY CLAIM

The present application is a continuation of U.S. patent application Ser. No. 11/873,319, filed Oct. 16, 2007, which is set to issue on Nov. 5, 2013 as U.S. Pat. No. 8,576,922, which claims priority to provisional application No. 60/943,060 filed Jun. 10, 2007, the contents of which are incorporated herein in their entirety.

FIELD OF THE INVENTION

The present invention relates to audiovisual data stream processing techniques and, more specifically, to a technique for handling capture and playback synchronization issues with different media input types.

BACKGROUND

Recent developments in consumer electronics have included the recording and playing back of movies and other digital media delivery. Referring to FIG. 1, a schematic diagram of a typical digital media delivery system 100 is shown. A typical computer, such as a laptop, is configured with a camera 106 and a microphone 104, each for capturing input or sampling data as input. The camera is coupled to a reference clock, referred to herein as the camera clock 102. Similarly, the microphone also is coupled to a reference clock, referred to herein as the microphone clock 108. The camera captures sample data with respect to the camera clock. The microphone captures sample data with respect to the microphone clock. Upon capturing sample data, both the camera and the microphone send the respective captured sample data as input to a file 112. The computer plays back the data in the file 112, i.e. the data from the camera and the data from the microphone, using the computer's clock as a reference.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
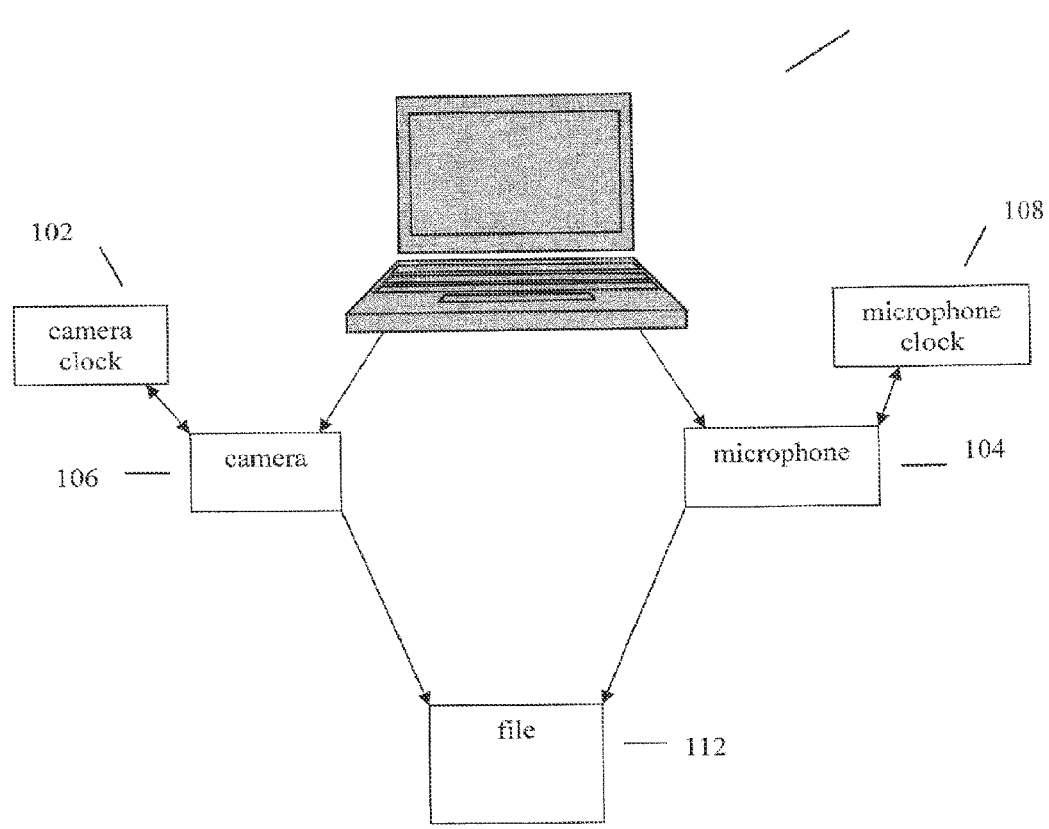
FIG. 1 is a schematic diagram of a digital media delivery system according to the prior art.

Referring to FIG. 1, when the camera source 106 and the microphone source 104 are combined and written to file 112, it is possible for the respective data to be out of synchronization. That is, the microphone clock 108 is slower than the camera clock 102 or the camera clock 102 is slower than the microphone clock 108. For example, suppose camera is instructed to sample 30 frames per second and the microphone is instructed to sample 48000 samples per second. Because of variations in hardware clock accuracy, the camera may actually sample 30.15 samples per second, and the microphone may actually sample 47760 samples per second. Suppose 100 seconds of data from each of the microphone and the camera are transferred, combined, and written to the file. When the combined data is played back, instead of the audio and video playing in synchronization, the audio will finish in 99.5 seconds, and the video will finish 1 second later, in 100.5 seconds.

It should be appreciated that the camera and microphone are by way of example and are not meant to be limiting. It should further be appreciated that video is used herein interchangeably with camera and that audio is used herein interchangeably with microphone.

Figure 2:
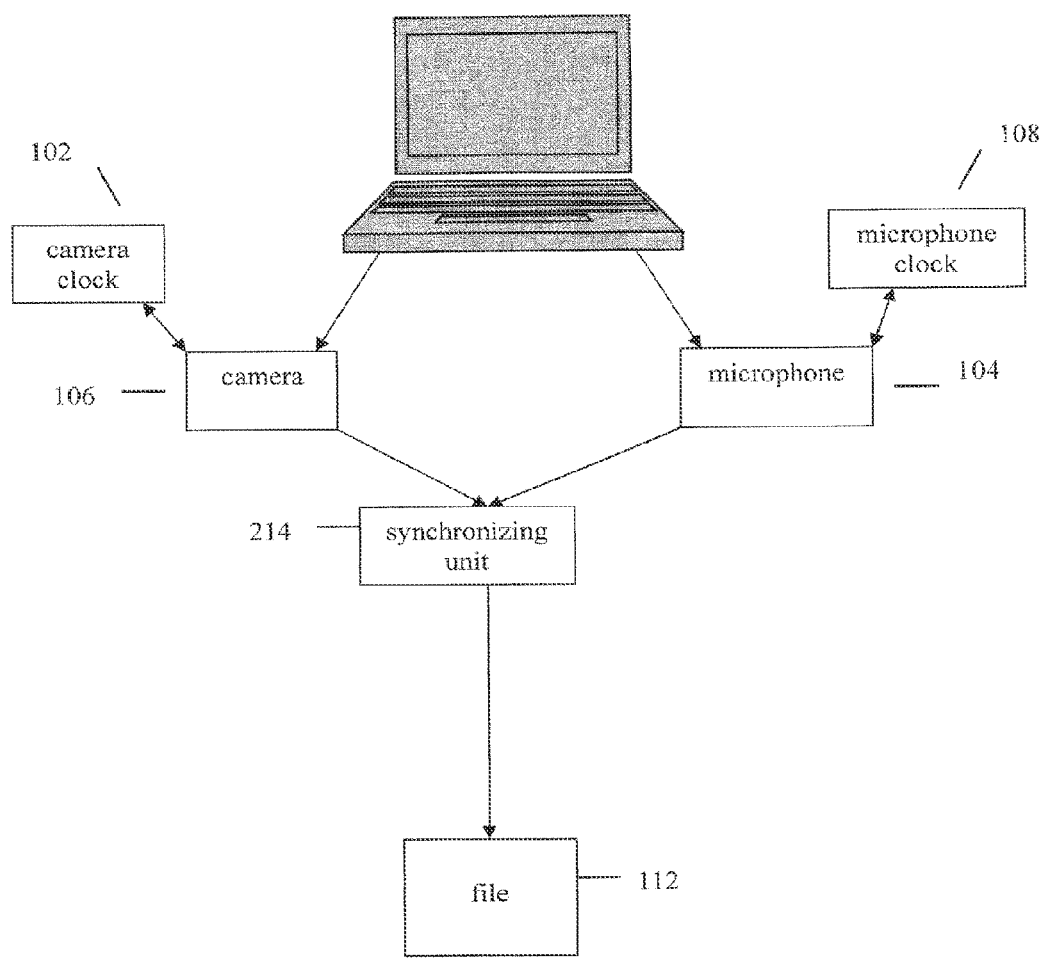
FIG. 2 is a schematic diagram of a digital media delivery system showing that the input data streams are synchronized according to an embodiment.

One embodiment takes one of the camera or microphone inputs and adjusts that input's timing such that when that input is written to the file, the combined data from the microphone and camera is synchronized. For example and referring to FIG. 2, in one embodiment, the camera clock 102 is designated as a master clock by which to measure all data written to the file 112. The camera clock 102 is measured relative to the microphone clock 108, which is possible because the computer, such as the laptop, is configured to read both clocks. In one embodiment, the second input device re-samples its data based on the master clock. In this example, the 47760 samples collected per second are run through a re-sampling algorithm, which already resides on the computer in a synchronization unit 214, which re-samples the audio data and outputs 48240 samples per second. By way of this embodiment, both inputs, i.e. from the microphone and the camera, take the same amount of playtime or play back.

It should be appreciated that describing one camera input and one microphone input is for illustrative purposes only and is not meant to be limiting. In other embodiments, there can be one or more camera inputs and one or more audio inputs as well as other media inputs.

In one embodiment, the audio is chosen as the master clock because the master clock runs at a higher frequency and can be more accurate than another device's clock. In one embodiment, one or more video frames are added, e.g. by duplication of existing video frames, or deleted so that the video play back is the same as the audio play back based on the common clock of the file.

Figure 3:
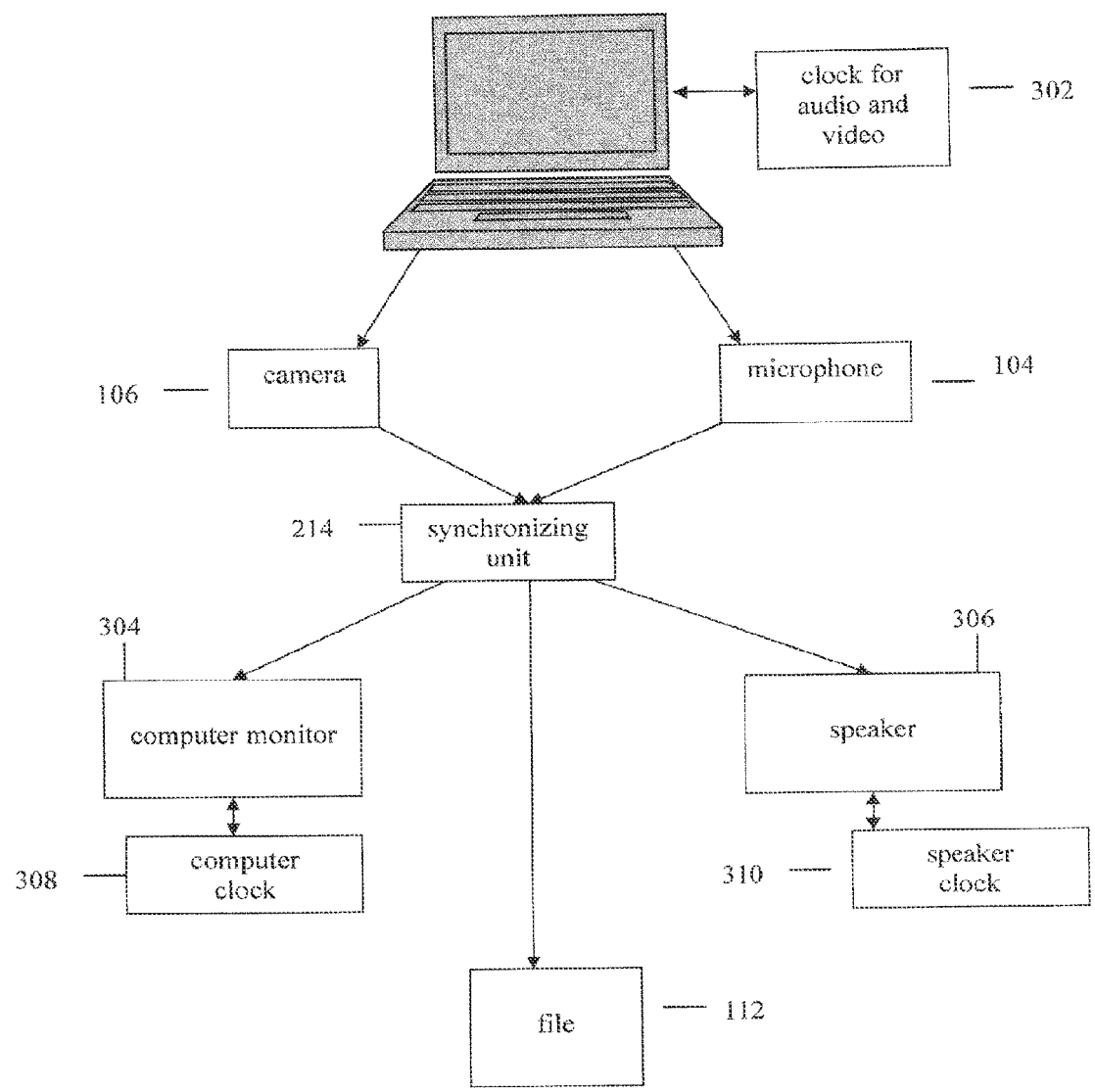
FIG. 3 is a schematic diagram of a digital media delivery system showing that the output data streams are synchronized according to an embodiment.

Another embodiment can be described with reference to FIG. 3. In this embodiment, the process is reversed. The capturing devices are synchronized with each other because the capturing devices are based on the same clock. For example, the audio device 104 and the video device 106 are synchronized together based on the same clock for audio and video 302. In this example, it is desired to preview the captured input on a display 304 and a speaker 306. Time adjusting is performed at the synchronizing unit 214 for the preview functionality so that the monitor 304, having its own clock 308, and the speaker 306, having its own clock 310, play back the captured media in a synchronized fashion. It should be appreciated that data transferred into the file 112 do not have to be adjusted in this embodiment.

In one embodiment, the video device produces a combination of intraframes (I-frames), predictive frames (P-frames), and bi-directional predictive frames (B-frames). It should be appreciated that herein I/P-Frame represents an I-frame or a P-frame and that I/P/B-Frame represents an I-frame, P-frame, or a B-frame. In such an embodiment, it is, desirable to adjust the audio samples rather than the video samples. Adjusting the video samples in such an I/P/B-Frame stream can be a complex operation because a frame cannot easily be pulled out or added in.

An Exemplary Synchronization System and Processes for Capturing Media in Synchronized Fashion An exemplary system and processes for capturing media in synchronized fashion is described herein below. It should be appreciated that the discussion hereinbelow refers in part and in general to a synchronization system, component, process, processes and the like. However, such referral is for illustrative purposes only and is not meant to be limiting. It should further be appreciated that the specific details are meant by way of example only and are not meant to be limiting.

It should be appreciated that the discussion herein this document contains references to media data that are held in buffers. Herein and as is discussed in certain embodiments, the contents of such buffers are shared by different components. In certain embodiments, to share the contents of these buffers without copying the contents, a retain/release semantic and technique is used. That is, each and every entity that accesses memory held by the buffer is said to "retain" the buffer. When an entity no longer needs to access the buffer, the entity "releases" the buffer. When all entities that have retained a buffer release the buffer, the buffer is deemed no longer required. When the buffer is no longer required, the buffer is returned to the system store and is subsequently available for filling with new media data as desired.

Overview

Figure 4:
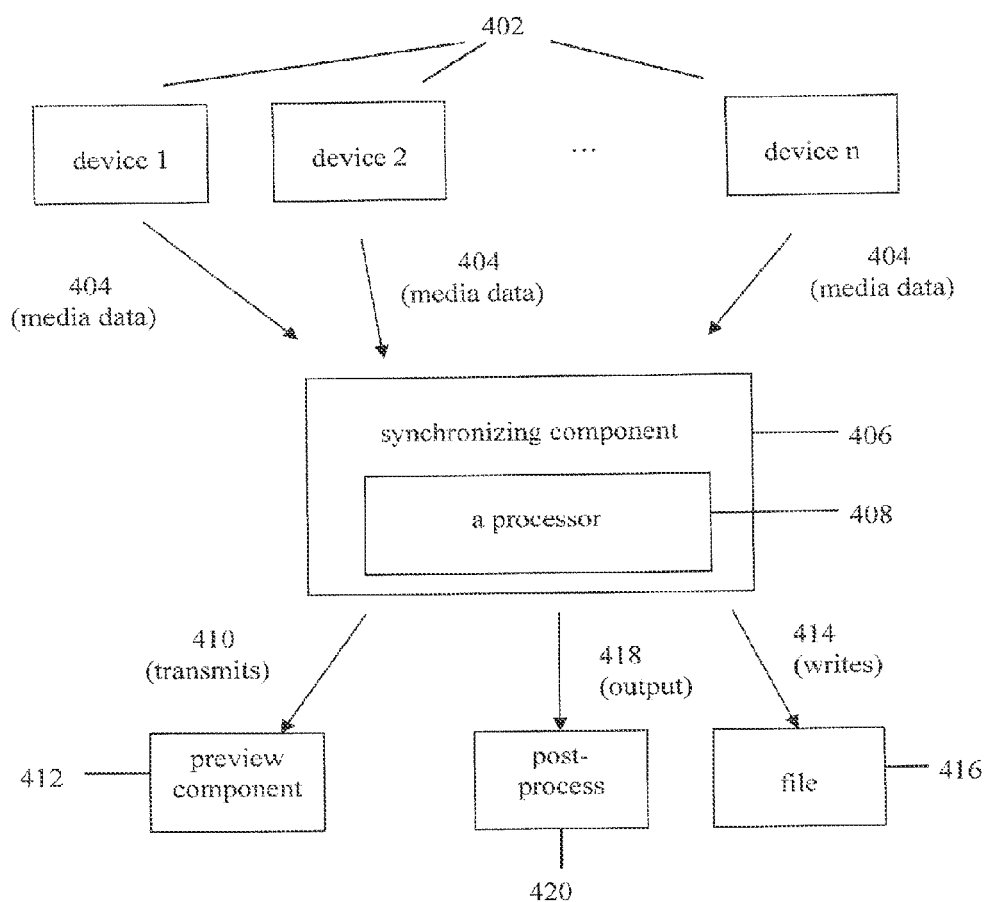
FIG. 4 is a schematic diagram of a digital media delivery system showing a plurality of input media devices and a variety of output devices according to an embodiment.

Referring to FIG. 4, one embodiment alloys multiple devices 402 to provide media data 404 to a synchronization component 406 having processing capabilities 408. The synchronization component 406 processes the input media data and can transmit the processed media data 410 to a preview component 412 and/or write the processed media data 414 to one or more files 416, e.g. QuickTime Movie files, while maintaining synchronization between the different media streams. It should be appreciated that the outputted processed media data 418 can be used in an unlimited variety of post-processes 420 and that the preview component and the file are for illustrative purposes only and are not meant to be limiting.

Media Sources

There are two types of media data sources identified. One type of media data source includes devices that provide data at the same rate for which the data is to be presented. The second type of media data sources include non-realtime sources, where the rate of delivery cannot be used for real-time playback.

Included in the category for devices that provide data at the same rate for which the data is to be presented are network connections that stream media. Network connections deliver data in real-time. However, network connections that deliver data in real-time may be prone to very bursty behavior. Data is said to be bursty when the data's instantaneous transmission rate varies from the data's nominal transmission rate. For example, video data may be transmitted over a computer network that, because the computer network serves multiple clients, the computer network cannot guarantee delivering that data at a fixed rate. For example, assume the sender wants to send 30 frames every second. The computer network may be able to send all 30 frames. Or, perhaps, on any given second the computer network can only send 20 frames, while during the next second the computer network can send 40 frames. The 40 frames consisting of the remaining 10 frames not sent during the prior second plus the 30 frames sent during the current second. Hence, in an embodiment, network connections delivering data in real-time and prone to bursty behavior may require special considerations to account for timing variations due to the bursty behavior.

Examples of non-realtime sources where the rate of delivery cannot be used for real-time playback include:
  devices that transfer data at some large percentage of presentation time, such as a device providing two times the transfer rate; and
  files mounted on the file system.

Media Timing Information

Every buffer that is processed by a synchronization system needs to have sufficient timing information, such as:
  a valid presentation time stamp;
  a valid duration; and
  if a buffer is to be decoded out of order, a valid decode time stamp.

For real-time stream cases, the presentation time stamp and (optional) decode time stamp is related to a real-time clock.

For non-realtime sources, such values are mathematically generated values, or provided in the stream.

Media Classes

Five types of media application classes are identified, as follows:
  Uncompressed audio;
  Compressed audio;
  I-Frame-only video;
  I/P-Frame video; and
  I/P/B-Frame video.

Media Stream Types

Three media stream types are identified, as follows:
  Audio-only streams,
  Video-only streams,
  Audio-Video muxed streams.

It should be appreciated that a muxed device is a device that provides audio and video together, and as such, the device has synchronized the two media components to a common clock reference.

Device Combinations

The following combinations are considered:
  Audio-only device paired with video-only device,
  Audio-only device paired with video from a muxed device.
  Video-only device paired with audio from a muxed device.
  Audio from a muxed device paired with video from a muxed device.

Sync Issues

When attempting to write a file that consists of media from separate devices, it is important to note that there are two synchronization issues to consider, Start-up sync and Drift.

Regarding start-up sync, the devices must supply time stamps that can be related to a common time line or common timebase. For example, it is not desirable to have one device providing presentation time stamps that are based at 0, and another device providing presentation time stamps that are based at 1000000. Regarding the drift issue, even if a starting time can be agreed upon, because separate devices are usually driven by independent clocking sources, it can be expected that the presentation time stamps (and decode time stamps, if present) of the independently clocked sources will drift apart over time.

Determining the Time

In one embodiment, every device provides, via a device abstraction layer (DAL) device property, a media clock that is driven by the device's timing source. A media clock is another name for a clock abstraction, such as, for example, a clock that is a property of a device and that has associated therewith a set of routines or functions that are used to establish certain time on the clock.

In an embodiment, one of the device clocks is chosen as the master clock for the synchronization system. The timebase of the synchronization system's master clock is referred to as the master timebase. Devices relate each of the devices' clocks to the master timebase to determine both the timing start point and the rate at which the devices deliver media.

Rate Reconciliation Issues

There are two strategies for keeping two independent media streams in synchronization, rate-convert one of the streams, and record in the movie the observed rate, as opposed to the device's advertised rate. Each of the two strategies has pros and cons, depending upon the media formats involved and the needs of the client application, as explored hereinbelow. Rate converting video and audio are discussed separately hereinbelow.

Rate Converting Video

Rate converting video can be accomplished by keeping track of the amount of drift. When the drift amount reaches a specific threshold, one of the following processes is performed:

If the device is running faster than the master timebase, either:
  Modify the display time stamp, decode time stamp (if present), and duration to values that represent a frame being played for two frame times,
  Duplicate a frame,
If the device is running slower than the master timebase:
  Drop a frame.

An advantage of the rate converting video methodology described hereinabove is that the methodology can be compatible with many clients. Also, the duplicate a frame strategy provides that every frame has the same duration, which may be easier for clients to handle.

Rate Converting Audio

There is only one way to rate convert audio, and that is to resample it.

Rate converting audio is an acceptable solution when using audio that is being associated with a video format that cannot be rate converted or for clients that expect video at a specific rate.

Recording the Measured Rate for one of the Streams

Video and audio are discussed separately.

Recording the Measured Rate of Video

To record the measured rate of video, the video frames' display time stamp, decode time stamp (if present), and duration are adjusted to values that are not required to be on integral frame duration boundaries. Some advantages of such methodology to record the measured rate of video are the methodology is quick and efficient, no frames are added, and no frames are lost.

Recording the Measured Rate of Audio

When recording the measured rate of audio, unlike when recording the measured rate of video, generally, it is not possible to describe in a file the measured rate of recorded audio because the sample rate changes over time. Therefore, in an embodiment, when the sample information for an audio track is written to the file, the observed average sample rate is recorded. It should be appreciated that recording the observed average sample rate is quick and efficient.

Choosing a Rate-Reconciliation Method

The rate-reconciliation method chosen depends upon the devices involved and the formats the devices consume or produce. Instrumentation & Industrial Digital Camera (IIDC) and USB Video Device Class (USBVDC), examples of video-only inputs, are each capable of and may be amenable to adjusting rate of video via integral frame dropping and duration stretching (or duplicating frames). Some characteristics associated with integral frame dropping, duration stretching, and duplicating frames are as follows:
  users are not expecting constant rates;
  devices switch frame rates based on lighting conditions; and
  playback to the device is not an issue, because playback to the device is not possible.

Muxed devices are not amenable to adjusting the rate of video. Some reasons that muxed devices are not amendable to adjusting the rate of video are as follows:
  devices provide constant frame rates and users typically expect to see such frame rates;
  video rate adjustment strategies do not work well for more complicated muxed formats; and
  desire to playback to the device is common.

It should be appreciated that the audio rate can always be adjusted, if desired.

An Embodiment of a Proposed Solution

All real-time DAL devices provide a media clock using a property. All synchronisation system input units and output units provide a media clock if the input units and the output units are each representing a real-time device to the system. If the unit is connected to a DAL device, then the DAL device can report the device's media clock. The synchronization system has a timebase, a frame of reference from which to indicate time. For example, a client application of the synchronization system can assign a clock to the timebase. This clock becomes the master clock and the synchronization system's timebase becomes the master timebase.

In an embodiment, two specialized system units provide synchronization functions. The two specialized system units are the video synchronizer unit and the audio synchronizer unit. It should be appreciated that, in this embodiment, a synchronizer unit is associated with real-time providers and consumers of data. A Synchronizer unit is provided with a media clock and the synchronization system's master timebase. A synchronizer unit is in "pass-thru" mode if the unit doesn't have a media clock associated with it.

In an embodiment, for a synchronization system to be properly initialized, the synchronization system checks the following:
  If one of the system's input units provides a media clock, then all input units provide a media clock.
  If the system has input units with media clocks, then all of the synchronizer units have a reference to a media clock.
  If the system has no input units with media clocks, then all of the synchronizer units are in pass-through mode.

Audio synchronizer units perform synchronization via re-sampling. Video synchronizer units perform synchronization by using one of the following methods, for which a client may suggest a preference;

Modifying timestamps to reflect the desired rate.

Stretching frame durations to an integral multiple of the frame rate, or dropping frames (only applicable when the media stream does not contain derived frames).

Frame duplication or dropping frames (only applicable when the media stream does not contain derived frames).

Synchronizer units that are associated with the device that supplies the clock for the master timebase are deemed "master synchronizers", and as such, the synchronizer units pass the synchronizer units' media data through without changing any timing. Synchronizer input units convert the corresponding media clocks to the master timebase. Synchronizer output units convert from the master timebase to the corresponding media clocks.

In an embodiment, the audio synchronizer unit for input audio media appears in the graph after the input audio converter. In such embodiment, it is desirable to rate-convert audio coming from compressed sources at this stage.

Figure 5:
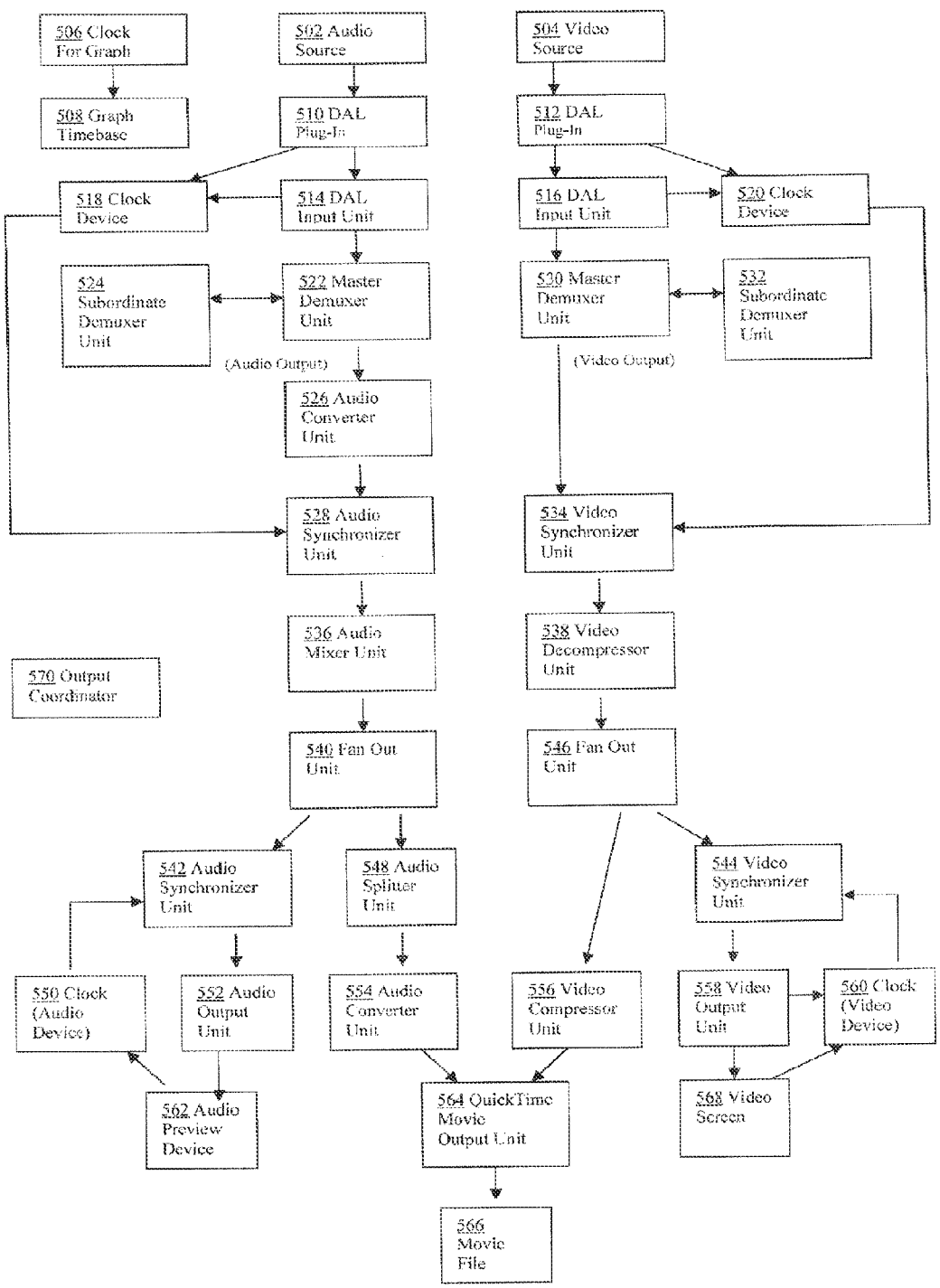
FIG. 5 is a schematic diagram of an embodiment of the digital media delivery system.

Referring to FIG. 5, there is shown an illustration of a synchronization system 500 (therein referred to as "graph") according to one embodiment. However, before describing certain aspects of the synchronization system, certain terminology is clarified. Herein, functional units are units that pass media data from one unit to another unit. Conceptually, a collection of functional units capable of passing media from one unit to another unit can be referred to as a processing graph. A processing graph is managed by a graph manager. The graph manager is a set of algorithms that manage the processing graph. Certain responsibilities of the graph manager are tracking each unit within the processing graph ("graph") and maintaining instructions for each such unit on how to pass media data to another unit.

Two sources of input are an audio source 502 and a video source 504. A DAL Plug-In for component for audio 510 is coupled to the audio source 502. A DAL Plug-In for component for video 512 is coupled to the video source 504. The DAL plug-ins contain software that provides an interface between a device and the computer. In this case, the DAL plug-ins are responsible for receiving media data from devices and placing the data in memory buffers that are annotated with descriptions of the data's format and timing information. The DAL Input Unit for audio 514 and the DAL Input Unit for video 516 are each responsible for receiving memory buffers from a DAL Plug-In and for holding on to the received memory buffers until such time as the data in the received memory buffers can be processed in the graph. The Master Demuxer Unit for audio 522 and the Master Demuxer Unit for video 530 are each used as a proxy for the actual demultiplexer ("demuxer") unit that can separate audio and video streams from a memory buffer containing multiplexed media data. Because some devices can provide various formats of multiplexed data, the Master Demuxer Units 522 and 530 examine the annotated format information and use the audio Subordinate Demuxer Unit 524 or the video Subordinate Demuxer Unit 532, respectively, for the media data present. Audio Converter Unit 526 converts audio from its native format (such as MPEG1 Layer 2 compressed audio) into a format that is readily manipulated by other units in the graph, such as 32-bit floating-point non-interleaved Pulse Code Modulation (PCM) samples. The Audio Synchronizer Unit 528 and the Video Synchronizer Unit 534 take incoming media data and perform any necessary processing of such media data to synchronize the media samples to the master timebase for the graph 508, which is based on the media clock for the graph 506. The Audio Mixer Unit 536 remixes the audio media from the source 502 into a new format. For example, the source 502 may input stereo audio, but the end user may only want mono audio saved to the file. The newly formatted audio media is sent to a Fan Out Unit 540. The Video Decompressor Unit 538 converts compressed video media data (such as MPEG-2 video frames) to an uncompressed format (such as 4:2:2 YUV) so that the video media data may be easily recompressed into another format (such as H.264 video frames). The converted video media data is sent to a Fan Out Unit 546. Fan Out Units (540 and 546) allow the media data to be used by more than one subsequent unit in the system or graph. Output from the audio Fan Out Unit 540 is transmitted to the Audio Synchronizer Unit 542 and an Audio Splitter Unit 548. The Audio Splitter Unit 548 allows a client to reshuffle the audio data that is saved into the file. For example, if the audio media buffers have four channels of audio and the client only wants to save two channels of audio in a file, the Audio Splitter Unit 548 will drop the extra two channels of audio. Or for example, the client wants to replicate two channels of audio into four channels of audio, the Audio Splitter Unit 548 will replicate the first two channels to provide four channels of output. The Audio Synchronizer Unit 542 processes media data to be previewed. This unit performs any necessary processing of media data to synchronize the media samples to the media Clock 550 of a given audio output device 562. The Fan Out Unit 546 transmits media data to the Video Synchronizer Unit 544 and the Video Compressor Unit 556. The Video Compressor Unit 556 compresses video media buffers that exist in an uncompressed format (such as 4:2:2 YUV) into a compressed video format (such as H.264 video frames). The Video Synchronizer Unit 544 processes media data to be previewed. The Video Synchronizer Unit 544 performs any necessary processing of media data to synchronize the media samples to the media Clock 560 of a given video preview device 568. The Audio Output Unit 552 sends buffers of audio media to an audio sub-system 562 that is attached to the computer to allow the user to listen to audio media that is being captured. The Audio Converter Unit 554 (for file output) compresses audio media buffers that exist in an uncompressed format (such as 32-bit floating-point non-interleaved Pulse Code Modulation (PCM) samples) into a compressed format (such as MPEG1 Layer 2 compressed audio). The Video Output Unit 558 sends buffers of video media to a video sub-system 568 that is attached to the computer to allow the user to watch video media that is being captured. In an embodiment, the Quick-Time Movie Output Unit 564 receives input from the Audio Converter Unit 554 and the Video Compressor Unit 556. The QuickTime Movie Output Unit 564 then writes audio and video media data to one or more movie files 566 formatted in the QuickTime Movie file format. An Output Coordinator 570 ensures that preview units start playing media at the same time and is described in further detail hereinbelow.

Synchronizing Audio and Video Preview Startup

The above solution describes a technique for synchronization system units that provide audio and video preview functionality for presenting media to the user at the rate dictated by the master timebase. Hence, applying such technique ensures that audio and video do not drift relative to one another. Additionally, in an embodiment, a mechanism is provided that ensures that preview units start playing media at the same time. This mechanism is facilitated by a synchronization system output coordinator described hereinbelow.

The interrelationship between the output coordinator and the output units can be summarized as follows:

When the output coordinator is created, the output coordinator is provided an array of output units, as well as an array of synchronizer units that synchronize such output units, and the master timebase.

A creator function for the output coordinator notifies all of the output units the output coordinator marshals that the output units are to use the output coordinator for coordination e.g. by setting a property. That is, each functional unit has a pre-defined set of properties that can be manipulated by clients. The properties define how the functional units process data. For example, the video synchronizer unit may perform a task in a number of ways: adding or dropping frames or simply changing frame times and durations. Which way the video synchronizer unit performs the task is controlled by the setting of a pre-defined property related to the task.

The output coordinator retains the output units to which the output coordinator has been assigned and the output coordinator assumes that the output units retain the output coordinator. To break the circular retainment, the entity that manages the graph also retains a reference to the output coordinator.

When the time comes to tear down the graph, a graph manager directs the output coordinator to detach itself from the output units, e.g. by setting the output units' property to NULL. Setting the output units' property to NULL causes the output units to release the output coordinator. During detachment, the output coordinator also releases the output units to which the output coordinator was assigned. After detachment, the graph manager can then release the output coordinator.

The output coordinator provides a coordinated output timebase. The output timebase can be used by video output units to schedule the decoding and displaying of the media to be presented. The output timebase is slaved to the master timebase. In other words, the coordinated output timebase uses the master timebase as the reference timebase. The output timebase differs from the master timebase because the output timebase takes into account the latency that is required to present the media to the output devices. For example, suppose it takes one second for the video stream to get from within the computer processor to pixels that can be seen on the screen. In this example, the output timebase runs at the same rate as the master timebase, however is set one second behind the master timebase.

Output Coordinator States

Coordination works using a simple state machine. Transitions between the states can be monitored using the graph's notification center, or by polling the output coordinator for its current state. The output coordinator has six states, as follows.

0. Reset

This is also the initial state. The coordinated output timebase is stopped.

Transition out of this state occurs immediately.

1. Priming Video Output Synchronizers

In this state, the preview timebase is stopped, and all synchronizer units being coordinated start buffering media.

The act of priming, the synchronizer units for video output consists of those units examining media therein to determine when such units have received the buffer with the earliest presentation timestamp. At this point the synchronizer unit is primed, and informs the output coordinator of such.

Transition out of this state occurs when all the synchronizer units for video output have notified the output coordinator.

2. Priming Video Output Units

At this point, all synchronizer units being coordinated stop buffering. Then, each such synchronizer unit allows media to be sent to corresponding output components.

However, before letting media be sent on to the output components, the audio output synchronizer units insure that the presentation time for initial audio matches that of the video. This is determined by a query to the output coordinator for the earliest video presentation time that was indicated during the previous state. The audio output synchronizer units then prepend or trim from the media, which the audio output synchronizer units have been buffering, to get the audio and video presentation timestamps to line up. Each of the audio output synchronizer units also use the graph's timebase to resample media to match the output of the output device.

Audio output units buffer media, waiting for the signal to start sending data to one or more devices. In an embodiment, this is also a good time for an audio output unit to perform any preprocessing that is desired to be performed before the audio output unit sends media to one or more devices. Examples of such preprocessing may involve format conversion and filling IOProc buffers. IOProcs are input and output algorithms run on devices to receive and transmit data. Memory to store media data sent to and from devices are called IOProc buffers. In an embodiment, it may be prudent for an audio output unit to prebuffer as much media as possible so that the audio output unit can start immediately when signaled to do so.

Video output units send frames to be decompressed immediately, but only the frame with the earliest presentation timestamp is flagged to be displayed. The frames that are sent but not displayed are put into a supplementary queue in the order in which the frames have been received, so that such frames can be resent to the decompressor later (once the coordinated output timebase is started). When a decompressor working for a video output unit signals that the decompressor has decompressed the frame with the earliest presentation timestamp, the video output unit informs the output coordinator that the video output unit is primed.

Transition out of this state occurs when all of the video output units have informed the output coordinator that the video output units are primed.

3. Priming Audio Output Units

In this state, audio output units either start the devices or hook up IOProcs. When an audio output unit's IOProc first pulls for valid audio media, the audio output unit is considered primed and informs the output coordinator.

Video output units buffer data from input and do not send any frames to be decompressed.

Transition to the next state occurs when all of the audio output units have informed the output coordinator that the audio output units have been primed.

4. Starting to Run

The coordinated output timebase is started.

Audio output units continue sending data to devices.

Video output units resubmit those frames that were not displayed during the priming stage. Such frames are scheduled for playback using the coordinated output timebase, flagging them as having been already decoded. All new frames received are also scheduled for playback using the coordinated output timebase.

Transition out of this state is dependant upon the maximum amount of synchronization-induced latency that the client is willing to tolerate (a parameter specified when the output coordinator is created). If the client does not specify a valid amount of desired maximum latency, the state machine will transfer directly into the running state. Otherwise, the output coordinator will compare the system's timebase to the output coordinator's output timebase, and if the output timebase is lagging by an amount greater than the maximum desired latency, the output coordinator will force a coordination restart after one second if the output coordinator determines that the subsequent transitions through the state machine will be more timely (state machine transition latency is discussed hereinbelow). If a forced reset is not going to occur, then the next state, running, is transitioned to immediately.

5. Running

All coordinated output unit are fully up and running.

Transition out of this state occurs when a media-related discontinuity or a device-related discontinuity is encountered by any of the synchronizer units or the output units. The state transitioned to can be referred to as the reset state.

State Machine Transition Latency

The process of synchronizing audio and video output units introduces delay from when media data enters the graph to when media data is experienced by the user. The following can be some causes for delay:

A. Media must be present from all of the input devices. Invariably each device Provides media with a different amount of delay than the amount of delay for media provided by another device. For example, the most quickly available media will have to wait for the most slowly available media.

B. Media is prepared for presentation. Video media is decoded, which depending upon its format, may include frame reordering. Audio media is decoded and mixed.

C. Media is sent to its presented device. Again, each device will have the device's own latencies between when the device is given media and when the device actually presents the media to the user.

In general, there is not a lot that can be done with such delays. Such delays are inherent properties of devices and the central processing unit (CPU). However, item B. has some initial startup costs; namely, the first time a particular type of media is encountered, the system may experience delays as encoding and decoding devices or programs on digital streams (codecs) are located, loaded, and initialized. It is not uncommon for subsequent synchronizations to introduce less delay.

Some clients may be sensitive to the amount of delay introduced by synchronization (for example, a "chat" program may want to have its preview track the source as closely as possible). To facilitate this, the creation routine for the output coordinator has a parameter that specifies the maximum amount of latency that is desirable. If, after synchronizing the output units, the latency encountered is larger than the provided amount, the output coordinator restarts itself after one second if the output coordinator determines that the subsequent synchronization process will yield a shorter delay. Restarting may cause the output to glitch. While the restarting process may be mildly annoying for the user for video, the restarting process can be more annoying for audio for the user. As such, in one embodiment, it is recommended that audio output units keep output volume muted until the full running state is achieved.

Hardware Overview

Figure 6:
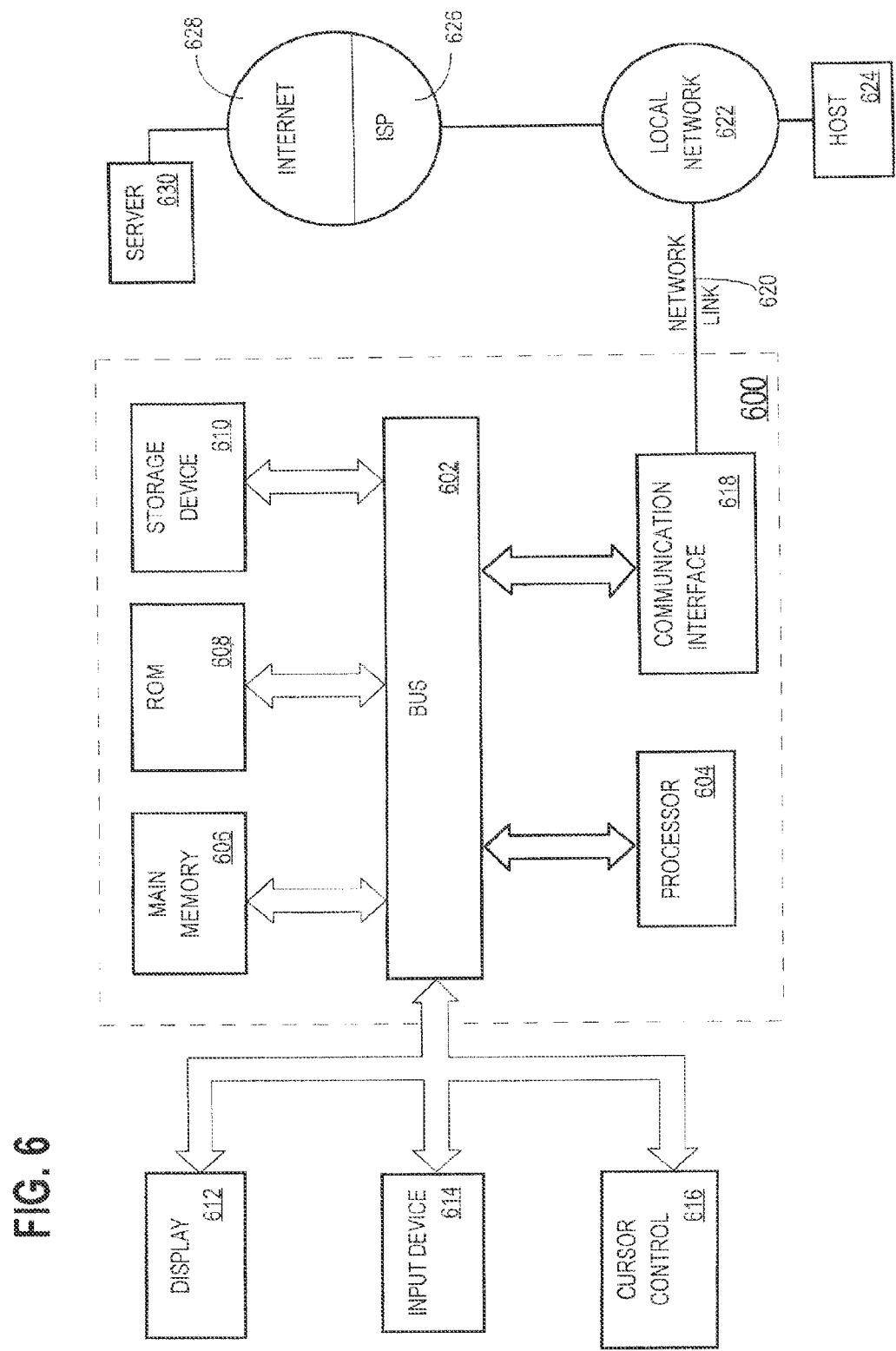
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as the code is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a computing device comprising an audio input device, a video input device, an audio output device, and a video output device, the audio input device and the video input device sharing a device clock, the audio output device and the video output device having separate device clocks, wherein one of the audio output device or the video output device is deemed a master output device and one of the audio output device or the video output device is deemed a subordinate output device, a method comprising:
    determining timing information that reflects a device clock rate difference between the device clock of the subordinate output device and the device clock of the master output device; and
    based on the timing information, processing the digital media stream to-be-outputted to the subordinate output device to produce a processed digital media stream that is synchronized to the digital media stream to-be-outputted to the master device.

2. The method of claim 1, wherein the audio input device is a microphone, the video input device is a camera, the audio output device is a speaker, and the video output device is a video monitor.

3. The method of claim 1, wherein the video output device is deemed the master output device; and wherein processing the digital audio media stream includes resampling the digital audio media stream.

4. The method of claim 1, wherein the audio input device is deemed the master device, and wherein processing the digital video media stream includes stretching frame durations to an integral multiple of the frame rate.

5. The method of claim 1, wherein the audio input device is deemed the master device, and wherein processing the digital video media stream includes adding a video frame to the digital video media stream by duplicating an existing video frame of the digital video media stream.

6. The method of claim 1, wherein the audio input device is deemed the master device, and wherein processing the digital video media stream includes deleting an existing video frame from the digital video media stream.

7. The method of claim 1, further comprising outputting the processed digital media stream to the subordinate output device.

8. The method of claim 1, wherein processing the digital media stream is performed in response to determining that the device clock rate difference exceeds a predetermined threshold.

9. The method of claim 1, further comprising concurrently receiving a digital audio media stream from the audio input device and a digital video media stream from the video input device.

10. One or more non-transitory computer-readable media storing instructions which, when executed by one or more processors, cause a computing device to perform a method, the computing device comprising an audio input device, a video input device, an audio output device, and a video output device, the audio input device and the video input device sharing a device clock, the audio output device and the video output device having separate device clocks, wherein one of the audio output device or the video output device is deemed a master output device and one of the audio output device or the video output device is deemed a subordinate output device, the method comprising:
    determining timing information that reflects a device clock rate difference between the device clock of the subordinate output device and the device clock of the master output device; and
    based on the timing information, processing the digital media stream to-be-outputted to the subordinate output device to produce a processed digital media stream that is synchronized to the digital media stream to-be-outputted to the master device.

11. The one or more non-transitory computer-readable media of claim 10, wherein processing the digital media stream is performed in response to determining that the device clock rate difference exceeds a predetermined threshold.

12. The one or more non-transitory computer-readable media of claim 10, wherein the audio input device is a microphone, the video input device is a camera, the audio output device is a speaker, and the video output device is a video monitor.

13. The one or more non-transitory computer-readable media of claim 10, wherein the video output device is deemed the master output device; and wherein processing the digital audio media stream includes resampling the digital audio media stream.

14. The one or more non-transitory computer-readable media of claim 10, wherein the audio input device is deemed the master device, and wherein processing the digital video media stream includes at least one of: stretching frame durations to an integral multiple of the frame rate, adding a video frame to the digital video media stream by duplicating an existing video frame of the digital video media stream, or deleting an existing video frame from the digital video media stream.

15. The one or more non-transitory computer-readable media of claim 10, the method further comprising outputting the processed digital media stream to the output device that is not deemed the master output device.

16. A computing device comprising:
one or more processors;
an audio input device;
a video input device;
an audio output device;
and a video output device, the audio input device and the video input device sharing a device clock, the audio output device and the video output device having separate device clocks, wherein one of the audio output device or the video output device is deemed a master output device and one of the audio output device or the video output device is deemed a subordinate output device;
one or more non-transitory computer-readable media storing instructions which, when executed by the one or more processors, cause performance of a method comprising:
determining timing information that reflects a device clock rate difference between the device clock of the subordinate output device and the device clock of the master output device; and
based on the timing information, processing the digital media stream to-be-outputted to the subordinate output to produce a processed digital media stream that is synchronized to the digital media stream to-be-outputted to the master device.

17. The computing device of claim 16, wherein the audio input device is a microphone, the video input device is a camera, the audio output device is a speaker, and the video output device is a video monitor.

18. The computing device of claim 16, wherein the video output device is deemed the master output device; and wherein processing the digital audio media stream includes resampling the digital audio media stream.

19. The computing device of claim 16, wherein the audio input device is deemed the master device, and wherein processing the digital video media stream includes at least one of: stretching frame durations to an integral multiple of the frame rate, adding a video frame to the digital video media stream by duplicating an existing video frame of the digital video media stream, or deleting an existing video frame from the digital video media stream.

20. The computing device of claim 16, the method further comprising outputting the processed digital media stream to the output device that is not deemed the master output device.

21. The computing device of claim 16, wherein processing the digital media stream is performed in response to determining that the device clock rate difference exceeds a predetermined threshold.

\* \* \* \* \*